United States Patent [19]

Koch

[11] 4,152,709
[45] May 1, 1979

[54] RECORDER FOR ELECTRIC APPLIANCES

[75] Inventor: Ferdinand R. Koch, San Antonio, Tex.

[73] Assignee: The Raymond Lee Organization, Inc., New York, N.Y. ; a part interest

[21] Appl. No.: 816,741

[22] Filed: Jul. 18, 1977

[51] Int. Cl.² .......................... G01D 9/00; G01D 15/16
[52] U.S. Cl. ..................................... 346/33 R; 346/123
[58] Field of Search ................ 346/20, 33 R, 121, 123

[56] References Cited

U.S. PATENT DOCUMENTS

| 430,551 | 6/1890 | Wade | 346/121 |
|---|---|---|---|
| 962,492 | 6/1910 | Card | 346/123 |
| 1,322,148 | 11/1919 | Sprague | 346/123 X |
| 1,950,832 | 3/1934 | Winter | 346/123 |
| 3,193,834 | 7/1965 | Frank | 346/123 X |

Primary Examiner—George H. Miller, Jr.
Attorney, Agent, or Firm—Daniel Jay Tick

[57] ABSTRACT

A disc-like sheet of pressure-sensitive material rests on a turntable rotatably mounted on a housing. The sheet has spaced scale markings there on around its circumference indicating units of time. A stylus arm is movably mounted on the housing in proximity with the turntable and has a stylus affixed to, and extending from, its free end and abutting the sheet of material at its axial area. The housing has a clock motor and solenoid electrically connected between an electrical appliance and a source of electrical energy. The motor rotates the turntable one revolution in a predetermined period of time. The solenoid moves the stylus to the circumferential area of the sheet during the operation energization and of the appliance to record such operation in the circumferential area during the time of operation. The stylus is in the axial area of the sheet during deenergization of the appliance to record inoperativeness of the appliance in the axial area.

1 Claim, 5 Drawing Figures

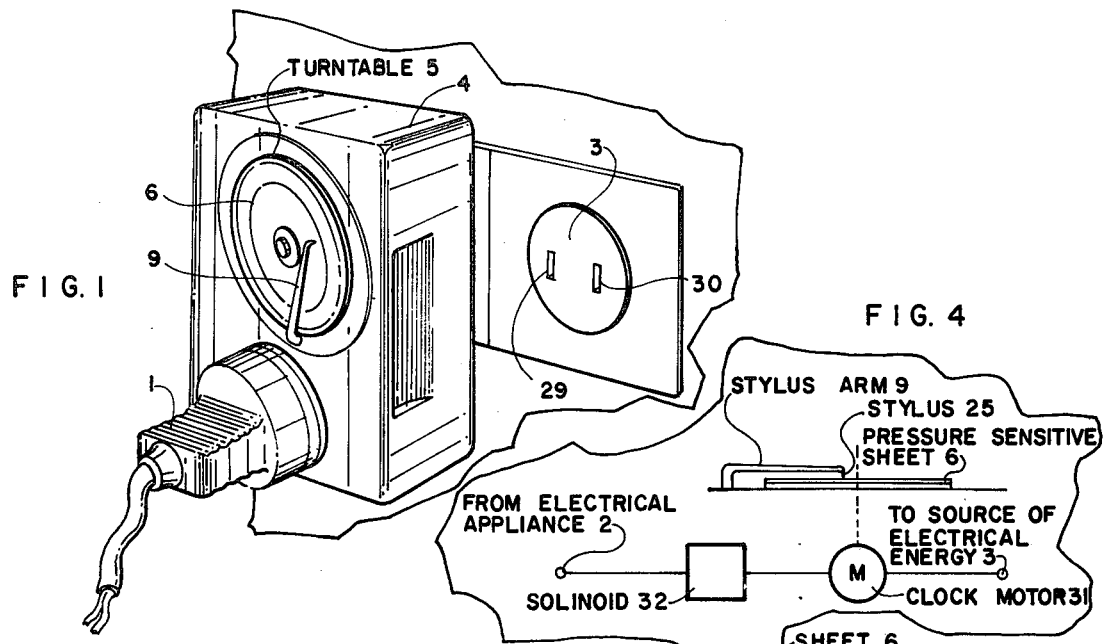
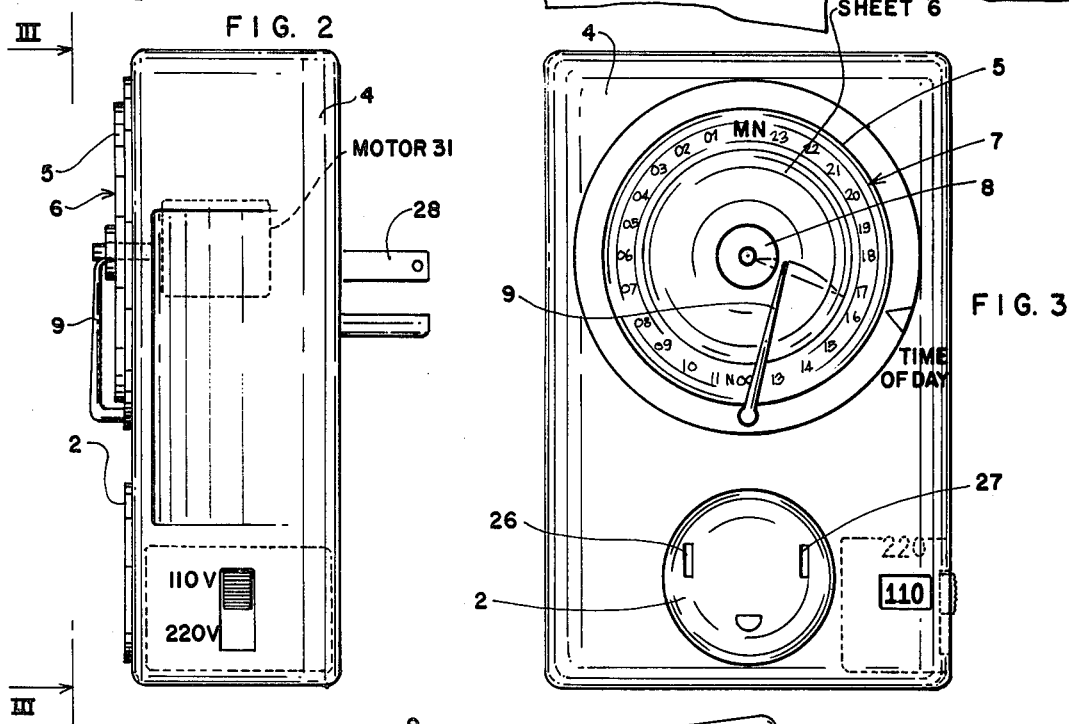
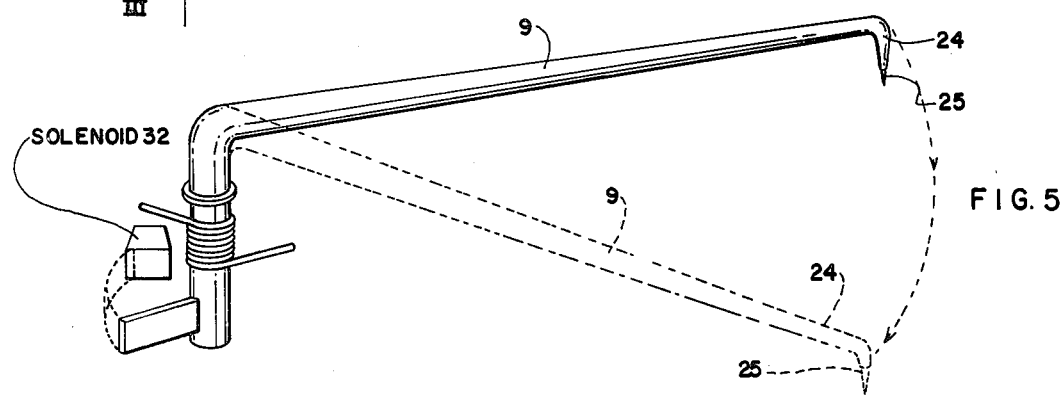

RECORDER FOR ELECTRIC APPLIANCES

BACKGROUND OF THE INVENTION

The present invention relates to a recorder for electric appliances. More particularly, the invention relates to a recorder for electric appliances for recording the time during a predetermined period of time that an electric appliance is operating.

Objects of the invention are to provide a recorder of simple structure, which is inexpensive in manufacture, installed with facility and convenience, used with facility and convenience, and functions efficiently, effectively and reliably to record the time during a period of time that an electric applicance operates. This enables a study of the operation of the applicance so that it may be controlled for maximum efficiency and conservation of energy.

BRIEF DESCRIPTION OF THE DRAWINGS

In order that the invention may be readily carried into effect, it will now be described with reference to the accompanying drawings, wherein:

FIG. 1 is a perspective view of an embodiment of the recorder of the invention for electric appliances;

FIG. 2 is a side view, on an enlarged scale, of the embodiment of FIG. 1; FIG. 3 is a view, taken along the lines III—III, of FIG. 2;

FIG. 4 is a schematic diagram of the embodiment of FIG. 1; and

FIG. 5 is a perspective view, on an enlarged scale, of an embodiment of the stylus arm of the recorder of the invention, illustrating its movement by the solenoid.

DETAILED DESCRIPTION OF THE INVENTION

The recorder of the invention for electric appliances functions to record the time during a predetermined period of time that an electric appliance is operating. The predetermined period of time is usually 24 hours. The appliance is represented by an electrical connector plug 1 (FIG. 1) and is symbolically indicated as being electrically connected to an input or first electrical connector device 2 of the recorder of the invention (FIGS. 3 and 4). The electric appliance is operable by electrical energy from a source of electrical energy 3, represented by a power outlet in FIG. 1 and symbolically indicated as an output in FIG. 4. The source of electrical energy may comprise any suitable source such as, for example, a commercial power source.

The recorder of the invention comprises a housing 4 (FIGS. 1 to 3).

A turntable 5 is rotatably mounted on the housing 4 (FIGS. 1 to 4).

A disc-like sheet of pressure-sensitive material 6 of any suitable type such as, for example, specially treated paper, removably rests on, and is rotatable with, the turntable 5, as shown in FIGS. 1 to 4. The sheet of material 6 has a circumference 7 (FIG. 3) and spaced scale markings thereon around its circumference indicating units of time. Thus, in the illustration of FIGS. 3, 24 hours are indicated around the cicumference of the sheet 6. The sheet 6 has an axial area 8 and a circumferential area 7, as shown in FIG. 3.

A stylus arm 9 (FIGS. 1 to 5) is movably mounted on the housing 4 in proximity with the turntable 5 and has a free end 24 (FIG. 5) over the hub of the turntable 5.

A solid stylus 25 (FIGS. 4 and 5) of any suitable type is affixed to, and extends from, the free end 24 of the stylus arm 9 and has a free end point which abuts the sheet 6 at its axial area 8 (FIG. 3).

The first electrical connector device 2 of the recorder consists of a power outlet in the housing 4 for releasable electrical connection to the electric appliance via the electrical connector plug 1 of said appliance. The power outlet 2 is of any suitable known type and includes a pair of spaced parallel input slots 26 and 27 for accomodating the corresponding prongs of the electrical connector plug 1.

A second electrical connector device 28 (FIG. 2) is provided in the housing 4 for releasable electrical connection to the source of electrical energy via the power outlet 3. The second electrical connector device 28 may comprise any suitable electrical connector plug having a pair of spaced parallel conducting prongs extending from the housing 4 for insertion into the corresponding slots 29 and 30 (FIG. 1) of the power outlet 3.

A clock motor 31 of any suitable type is provided in the housing 4 and is coupled to the turntable 5, as shown in FIGS. 2 and 4, and is electrically connected between the first and second electrical connector devices, as shown in FIG. 4. The motor 31 rotates the turntable 5 one revolution in the predetermined period of time, under the control of its clock. Thus, the motor 31 rotates the turntable 5 one revolution per day or 24 hours.

A solenoid 32 of any suitable known type (FIGS. 4 and 5) is provided in the housing in operative proximity with the stylus arm 9 and electrically connected between the first and second electrical connector devices, as shown in FIG. 4. The solenoid 32 moves the stylus arm 9 to the circumferential area 7 of the sheet of material 6 during the energization and operation of the appliance connected to the first electrical connector device 2 to record such operation in the circumferential area via the stylus 25 during the time of operation. The stylus 25 is in the axial area of the sheet of material 6 during deenergization of the appliance to record inoperativeness of said appliance in said axial area. The result is a series of circular segment lines in the axial area 8 of the sheet 6 for each period of now operation of the appliance and a series of circular segment lines in the circumferential area 7 of said sheet for each period of operation of said appliance.

While the invention has been described by means of a specific example and in a specific embodiment, I do not wish to be limited thereto, for obvious modifications will occur to those skilled in the art without departing from the spirit and scope of the invention.

I claim:

1. A recorder for electric appliances for recording the time during a predetermined period of time that an electric appliance is operating, said electric appliance being operable by electrical energy from a source of electrical energy, said recorder comprising a housing;

a turntable rotatably mounted on the housing;

a disc-like sheet of pressure-sensitive material removably resting on, and rotatable with, the turntable, said sheet of material having a circumference and spaced scale markings thereon around its circumference indicating units of time, said sheet of material having an axial area and a circumferential area;

a stylus arm movably mounted on the housing in proximity with the turntable and having a free end over the hub of the turntable;

a solid stylus affixed to, and extending from, the free end of the stylus arm and having a free end abutting the sheet of material at its axial area;

first electrical power connector means having a pair of spaced parallel input slots in the housing for releasable electrical connection to an electric appliance;

second electrical connector plug means extending from the housing for releasable electrical connection to a source of electrical energy;

clock motor means in the housing coupled to the turntable and electrically connected between the first and second electrical connector means for rotating the turntable one revolution in the predetermined period of time; and solenoid means in the housing in operative proximity with the stylus arm and electrically connected between the first and second electrical connector means for moving the stylus to the circumferential area of the sheet of material during the energization and operation of an appliance connected to the first electrical connector means to record such operation in said circumferential area during the time of operation, said stylus being in said axial area during deenergization of the appliance to record inoperativeness of said appliance in said axial area.

* * * * *